252/101 150

United States Patent Office 3,152,083

Patented Oct. 6, 1964

3,152,083

POWDERLESS ETCHING BATH ADDITIVE

Harold W. Croisant and John A. Easley, Midland, and Marvin H. Fishaber, Saginaw, Mich., assignors to The Dow Chemical Company, Midland, Mich., a corporation of Delaware No Drawing. Filed Nov. 28, 1961, Ser. No. 155,506
10 Claims. (Cl. 252—79.4)

This invention relates to an improved etching bath and methods for etching photoengraving plates, name plates, metal patterns and the like. More particularly, it is concerned with an additive for improving and controlling etching bath characteristics.

In the conventional method of making such objects as, for example, a photoengraving plate, a flat or cylindrical plate of an acid-soluble metal such as magnesium, zinc or one of their alloys is coated with a light sensitive coating or "enamel." This coated surface is exposed to light through a negative having an image thereon so as to produce an image on the coating. The exposed surface is then developed to form an acid-resistant coating corresponding to the image produced by the exposure. This acid-resistant coating is generally further hardened by heating and the final acid-resistant image is called the "resist." Subsequently, the image-bearing surface of the plate is subjected to etching by an acid to produce the image in relief. In carrying out the etching process, techniques are employed to reduce lateral etching which undercuts the resist and/or relief side walls causing a weakening, distortion or complete loss of the image. A common method in the art for minimizing lateral etching consists of powdering the sides of the relief with an acid-resistant etching powder, but this is a difficult and time-consuming operation which must be repeated a number of times for each plate.

Recent inventions have introduced and expanded powderless etching techniques. Inventions of this nature are disclosed in United States Patents 2,640,765, 2,640,767 and 2,828,194. Powderless etching is a complex art comprising variables which are only susceptible of scientific delineation through intensive research. It is to the further development of this art that the present invention is directed. More particularly, this invention is directed to the introduction of a film-controlling agent to powderless etching baths. The additive of this invention is designated as a film-controlling agent since it affords both a means for improving etching bath characteristics and a means for adjusting bath filming tendency.

The nature and value of this invention can be more fully appreciated through a summary consideration of some problems involved with the powderless etching art. One undesirable characteristic of some etching baths is their tendency to permit localized defilming on relief side walls. This results in a chipped surface which, in aggravated situations, causes poor printing plates. Another problem stems from the inability of some baths to quickly form a protective film in the initial stage of etching that will protect the resist from lateral etching directly beneath it and as the etching action of the acid penetrates to greater depths, there is a problem of preventing lateral etching of relief side walls so as to produce proper relief shoulders. Another problem of great importance is the capacity of the etching bath to produce proper depths of etch in all areas of a combination plate, i.e., a plate having both line and halftone image areas. This latter problem, for example, is most vexing because filming additives which may be expected to increase or stabilize the filming tendency of the etching bath usually also result in the production of lesser depths of etch in halftone areas of combination plates. While the use of smaller amounts of the filming additives might be expected to provide deeper etching in halftone areas, such modifications also tend to cause excessive etching and undercutting in open line areas of the same plate. Often the effect of the foregoing problems in unimproved etching baths is readily apparent to even the casual observer due to the rough appearance of the plate.

Objects of this invention are to provide an etching bath capable of producing proper depths of etch in all kinds of image areas of combination plates and to provide an etching bath capable of forming a stable, film protective against lateral etching and chipping of relief side walls. A further object is to provide an improved etching bath for producing name plates, metal patterns, templates and the like. Other objects will become apparent hereinafter as the invention is more fully explained.

Such objects are accomplished by an etching bath which includes (A) a mineral acid, (B) a water-immiscible organic fluid substantially stable in the presence of a dilute solution of the mineral acid, (C) a filming agent, (D) water and (E) a film-controlling agent of the invention which may be one, or a mixture, of organic dicarboxylic acids having from 4 to 10 carbons.

These bath additives and the amounts required are described in more detail below. Since etching baths are usually made up to stated volume, the amounts are expressed in terms of grams per liter of bath. Nitric acid is taken to mean 100 percent nitric acid unless otherwise specified.

The mineral acid additive is generally nitric acid although mixtures of nitric acid and small quantities of sulfuric, hydrochloric or acetic acids can be beneficial. Operable amounts of nitric acid range from 30 to 200 grams per liter of bath but a preferred range is from 50 to 150 grams per liter of bath. A desired range is 60 to 140 grams per liter of bath.

Another bath component is the organic, water-immiscible fluid which may be a single compound or blend of such compounds. Required properties of this additive are that it be substantially stable in the presence of dilute nitric acid, at bath temperatures, and that it have some solvency for the filming agent employed. Substantially stable is defined as the non-occurrence of deterioration, within a reasonable time period, due to the presence of dilute nitric acid which significantly alters the function of the organic water-immiscible component within the bath in an unfavorable manner. Also, it is essential that this additive is a liquid at bath temperatures. Suitable organic materials which can be used individually or in combination are hydrocarbon aromatics, aliphatics and naphthenics boiling from 90° to 390° C. as, for example, ligroin, kerosene, gas oils, diethylbenzenes, tetramethylbenzenes, diisopropylbenzenes and dodecylbenzenes. Other examples of water-immiscible fluids include turpentine, monochloroethylbenzene, ethyl butyl ketone, isophorone, methyl hexyl ketone, d-limonene, diisodecylphthalate, dicapryladipate and the like. Generally, it may be said that water-immiscible esters, ketones, terpenes, ethers, aliphatic, naphthenic and aromatic hydrocarbons are operable. Certain commercial solvents also serve very effectively as this component of the bath. An example is a commercial aromatic solvent under a trade name of Penola H.A.N. which contains 84 percent aromatics, has a flash point of 140° F. and a distillation temperature range at 760 mm. Hg: initial boiling point of 340° F., 50 percent distilled at 446° F. and dry point at 532° F. Another commercial aromatic solvent employed has the trade name Solvesso 150 which is a mixture of approximately 90 percent alkylbenzenes, 2 percent naphthalene and 8 percent naphthenes. It has a flash point of 150° F. and a distillation temperature range at 760 mm. Hg: initial boiling point of 303° F., 50 percent distilled at 378° F. and dry point at 415° F.

The amounts of the water-immiscible organic fluid employed may range from 3 to 150 grams per liter of bath but a preferred range is from 5 to 100 grams per liter of bath. A desired range is 10 to 60 grams per liter of bath.

The filming agent component of the etching bath may be a single compound or a blend of compounds. Individual filming agents may be further described as soluble, ionic hydrophobic-hydrophilic, organic compounds of the class of organic sulfonates and sulfates having at least 8 carbons. A preferred class of such agents for the purposes of the present invention are water-dispersible, organic sulfates or sulfonates having at least 10 carbons in an unbroken chain of carbon to carbon linkages. It is believed that the polar part of the filming agent molecule attaches to the surface of the metal to be etched and the hydrophobic segment on this molecule having an affinity for the molecules of the water-immiscible organic fluid attracts such molecules to it thereby perfecting an acid resistant film. Such being the case, the filming agents of this invention must be further characterized by having selective filming properties, i.e., they contribute to the forming of a stable acid-resistant film on relief side walls while permitting etching in adjacent resist-free areas under the conditions of bath application. The filming agents employed herein are totally soluble in the bath and partially soluble (at least 0.01 percent of the solute) in each of the bath phases, i.e., aqueous and organic phases. Illustrative filming agents suitable for use in this invention include petroleum sulfonic acids and their salts as disclosed in United States Patent 2,640,767, sulfonated esters of succinic acid of United States Patent 2,640,765, sulfated fats, oils and waxes of United States Patent 2,828,194, substituted halogenated diaryloxide sulfonates of a copending application entitled "Powderless Etching Bath," Serial No. 819,821, filed June 12, 1959, now issued as United States Patent 3,023,138, and sulfonated esters, amides and ethers of another copending application entitled "Powderless Etching Bath," Serial No. 819,823, filed June 12, 1959. Other filming agents include the alkylaryl sulfonates of United States Patent 2,846,295.

A particularly effective filming agent is characterized by the formula

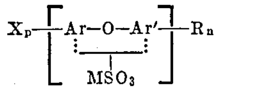

wherein the enclosed molecular nucleus represents a diaryloxide in which Ar and Ar′ are selected from a group consisting of phenyl and naphthyl and to which nucleus is appended from 1 to 3 sulfonic groups. R represents a hydrophobic substituent on the enclosed molecular nucleus having up to 30 carbon atoms and $n$ is an integer from 1 to 8, a limitation being that the number of carbon atoms of the entire compound does not exceed 50. X represents a halogen having an atomic number from 17 to 35 and $p$ is an integer from 1 to 3. The symbol M in the sulfonic group is hydrogen, an alkali metal, alkaline earth metal, ammonium or a substituted ammonium radical. The filming agents thus delineated are further characterized in that they must be soluble in the etching bath with partial solubility in each of the bath phases, viz. the aqueous and organic phases.

The amounts of the filming agent employed can range from 0.2 to 20 grams per liter of bath but a preferred range is from 1 to 15 grams per liter of bath. A desired range is from 2 to 10 grams per liter of bath.

The fourth bath additive is the film-controlling agent of the invention. This may be a single organic dicarboxylic acid or a blend of such compounds which individually consist of only hydrogen, carbon and oxygen and have 4 to 10 carbon atoms with up to 3 carbon to carbon double bonds, the latter referring to aromatic unsaturation as well as that which may occur in aliphatic chains. Such additaments may be aromatic, cycloaliphatic or aliphatic in character or a combination thereof such as alkylaromatic. These compounds, by virtue of the results achieved when they are employed in etching baths individually or in blends, are called film-controlling agents. By their use in the above-described etching baths, it is possible to increase the depths of etch obtainable in small areas of penetration in combination photoengraving plates such as halftone areas where proper or adequate depths of etch are usually difficult to obtain by bath modulation without, at the same time, adversely weakening the protection achieved in open line areas of the same plate. In addition, the film-controlling agents have a beneficial stabilizing effect on the protective film in open line areas of the plate thereby minimizing lateral etching and chipped or rough surfaces.

Amounts of the film-controlling agent employed are surprisingly small for the results to be accomplished. The amount employed can range from about 0.05 to about 3 grams per liter of bath but a preferred range is from 0.08 to 2.5 grams per liter of bath. A desired range is from 0.10 to 2.0 grams per liter of bath.

The remainder of the bath is water but it should be understood that other materials may also be present within the bath. One reason for this is that as a practical matter it is not possible to employ the aforementioned bath components in a pure state.

In the practice of the present invention, it has been found desirable to impinge the bath upon the surface to be etched as by spraying or by splashing. The bath selectively forms an acid-resistant film on the plate under the conditions of its application thereby allowing etching in resist-free areas normal to the surface of the metal plate while, at the same time, protecting the resist and the relief side walls from lateral etching.

In formulating the etching bath, it is a general rule that as the concentration of the nitric acid is increased within the aforementioned limits, it is necessary to also increase the proportion of filming agent employed. Also, as will be manifest to those skilled in the art, it may become desirable during the use of the bath to replenish the acid that has been used up and possibly to add other agents such as bath extenders for special purposes.

Metals which may be etched by the process of this invention include zinc, zinc base alloys, magnesium and magnesium base alloys, which metals are substantially homogeneous and suitable for photoengraving. A zinc or magnesium base alloy is defined as having 70 percent of the base component. The average bath temperature may be within a range from 40° to 120° F. but a preferred range is from 60° to 90° F.

A preferred embodiment of this invention comprises nitric acid in an amount from 80 to 120 grams per liter of bath, preferably 103 grams per liter of bath, diethylbenzene in an amount from 20 to 80 grams per liter of bath, preferably 40 grams per liter of bath and an 80 percent/20 percent mixture of sodium monochloro dodecyl diphenyloxide monosulfonate and sodium monochloro dodecyl diphenyloxide disulfonate in an amount from 2.5 to 6 grams per liter of bath, preferably about 4 grams per liter of bath. The fourth active component is adipic acid of the invention in an amount from 0.3 to 2.0 grams per liter of bath, preferably 1.5 grams per liter of bath. The remainder of the mixture is water.

To carry out the etching process, it is preferred to employ an etching machine of the type disclosed in United States Patent 2,669,048, issued February 16, 1954. In this "DowEtch" machine, rotated elongated paddles intermittently splash the etching bath against the image-bearing surface of the object being etched. The splashing action of the paddles also serves to keep the bath in a homogeneous state.

A bath employing the film-controlling agent of this invention may produce plates improved by as much as 50 percent in depths of etch obtained in various image areas of the plate, particularly in the small image areas such as halftones. Etch factors realized may be increased by as much as 100 percent. "Etch factor" as used in this specification is defined as the ratio of the depths of etch adjacent to a line of resist divided by one-half of the loss in width of metal immediately beneath the resist. Obviously, it is desirable to have as high etch factors as possible for faithful reproduction of the image in relief but as the etch factor formula indicates, the factor can be sensitive to changes in depth and therefore it should be considered as only a rough approximation of plate quality.

The following examples are intended to be merely illustrative of the invention and should not be construed as limitations thereof.

*Example 1*

A powderless etching bath of 6 liters was prepared by mixing together in a miniature "DowEtch" machine 708 grams of nitric acid, 30 grams of sodium monochloro dodecyl diphenyloxide monosulfonate, 360 grams of "Penola H.A.N." and sufficient water to bring the volume up to 6 liters. The bath temperature was adjusted to 75° F. A photoengraving plate of a magnesium base alloy containing 3 percent aluminum, 1 percent zinc and trace amounts of impurities, having a polyvinyl alcohol resist thereon was descummed by brushing the surface with dilute nitric acid until the surface was bright. The plate was then placed in the machine and the etching action was allowed to continue for 6 minutes. In open line areas of the plate, the depth of etch was 0.017 inch and in 65 line screen halftone areas of the same plate, the depth of etch was 0.0045 inch.

For a second run, 10 grams of adipic acid was added to the foregoing bath. Another plate similar to the foregoing plate was prepared and etched for 6 minutes. Depths of etch of 0.015 inch in open line areas and 0.0065 inch in 65 screen halftone areas were achieved. A third run was made on another similar plate with the adipic acid bath wherein etching was allowed to continue for 10 minutes. Open line areas had a depth of etch of 0.025 inch and 65 screen halftone areas had a depth of etch of 0.0065 inch. Lateral etching was at a minimum and the result was good printing plate.

*Example 2*

In a manner similar to that of Example 1, an etching bath was prepared by mixing together 708 grams of nitric acid, 30 grams of dodecylbenzene, 60 grams of diethylphthalate, 90 grams of "Penola H.A.N." and 13 grams of sodium monochlorododecyl diphenyloxide monosulfonate. The remainder of the bath was water. The bath temperature was adjusted to 72° F., and a photoengraving plate similar to that employed in Example 1 was etched for 6 minutes. The depth of etch in open line areas was about 0.015 inch. Also, there was evidence of slight lateral etching and a general roughness and shallowness in small type areas.

For a second run, 1 gram of malic acid was added to the same bath and another plate identical to that above was etched under the same conditions for 6 minutes. The depth of etch in open line areas was again 0.015 inch with slight lateral etching, but comparatively, the second plate was smooth and adequate penetration in small type areas had been achieved.

*Example 3*

In a manner similar to that of Example 1, an etching bath of 6 liters was prepared by mixing together 708 grams of nitric acid, 360 grams of Solvesso 150 and 32 grams of sodium monochlorododecyl diphenyloxide monosulfonate. The remainder of the bath was water. The bath temperature was brought to 75° F. and a photoengraving plate similar to that of Example 1 was etched for 6 minutes, obtaining thereby depths of etch of 0.0195 inch in open line areas and 0.005 inch in halftone areas. However, small isolated images were severely attacked.

For a second run, 6 grams of succinic acid were added to the same bath and an identical plate etched under the same conditions for 6 minutes obtaining thereby a depth of etch in open line areas of 0.0175 inch and 0.007 inch in halftone areas, but in this instance, small images remained intact and as indicated, more depth was obtained in the halftone areas.

*Example 4*

In a manner similar to that of the foregoing examples, a 6 liter etching bath was prepared from 708 grams of nitric acid, 360 grams of Solvesso 150 and 20 grams of sodium monochlorododecyl diphenyloxide monosulfonate. The remainder of the bath was water. The bath temperature was brought to 75° F. and a photoengraving plate similar to that of Example 1 was etched for 6 minutes. Depths of etch in open line areas of approximately 0.019 inch and in 65 line screen halftone areas of about 0.005 inch. However, isolated small images such as leader dots were etched away.

For a second run, 6 grams of pimelic acid were added to the same bath and an identical plate etched under the same conditions for 6 minutes. Depths of etch in open line areas were again approximately 0.019 inch and depths of etch in 65 line screen halftone areas were about 0.0055 inch with very little loss in the small isolated images.

*Example 5*

In a manner similar to that of the foregoing examples, a 6 liter etching bath was prepared from 588 grams of nitric acid, 150 grams of dimethylphthalate and 30 grams of a mahogany soap having an average molecular weight from 400 to 410. The remainder of the bath was water. The bath temperature was adjusted to 75° F. and a plate similar to that of Example 1 was etched for 6 minutes. Depth of etch in open line areas was about 0.017 inch and the depth of etch in 65 line screen halftone areas was about 0.0035 inch. In this instance, halftone depths were insufficient.

A second run was made after adding 10 grams of adipic acid to the same bath. An identical plate was etched for 6 minutes. The depth of etch in open line areas was about 0.011 inch and the depth of etch in 65 line screen halftone areas was about 0.0055 inch.

*Example 6*

In a manner similar to that of the foregoing examples, a 134 liter etching bath was prepared in a commercial size "DowEtch" machine from 12,435 grams of nitric acid, 5,360 grams of Solvesso 150, 738 grams of sodium monochlorododecyl diphenyloxide monosulfonate and 200 grams of adipic acid. The remainder of the bath was water. Bath temperature was adjusted to 72° F. and a template approximately 9" x 6" x .064" of a magnesium base alloy having 3 percent aluminum, 1 percent zinc and trace amounts of impurities, with a resist covering all of the plate but the periphery of the shape to be produced, was placed in the machine and etched for 28 minutes.

The metal was etched through resulting in the production of an accurate metal template having side walls substantially perpendicular to the surface of the template.

In a like manner to that of Example 1, improved results are achieved with a powderless etching bath in which the adipic acid is replaced by an effective amount of one or more other film-controlling agents such as suberic, azelaic, sebacic, terephthalic, phthalic and hexahydrophthalic acids. Also, in a like manner to that of the foregoing specific examples, other filming agents can be employed to achieve similar improved results. Examples of such other filming agents are sulfated fats, oils and waxes, halogenated diaryloxide sulfonates, alkyl benzene sulfonates, alkyl naphthalene sulfonates, sulfonated esters, amides and ethers and the like sulfur-containing compositions.

Various modifications may be made in the etching bath and method of applying it without departing from the spirit and scope of this invention and it is to be understood that we limit ourselves only as defined in the appended claims as read in light of the specification.

What is claimed is:

1. An aqueous etching bath comprising (A) 30 to 200 grams per liter of bath of nitric acid, (B) 3 to 150 grams per liter of bath of a water-immiscible organic fluid substantially stable in the presence of dilute nitric acid, (C) 0.2 to 20 grams per liter of bath of an ionic, hydrophobic-hydrophilic, organic filming agent selected from the group consisting of organic sulfates and organic sulfonates having at least 8 carbons, (D) a small but effective amount of an organic dicarboxylic acid consisting of only hydrogen, carbon and oxygen and having 4 to 10 carbons, said amount being sufficient to increase the depth of etch achieved in small areas of penetration and to minimize lateral etching of the relief image on photoengraving plates etched with the bath, and (E) a remainder of water in each liter of bath.

2. An aqueous etching bath comprising (A) 30 to 200 grams per liter of bath of nitric acid, (B) 3 to 150 grams per liter of bath of a water-immiscible organic fluid substantially stable in the presence of dilute nitric acid, (C) 0.2 to 20 grams per liter of bath of an ionic, hydrophobic-hydrophilic, organic filming agent selected from the group consisting of organic sulfates and organic sulfonates having at least 8 carbons, (D) from about 0.05 to about 3 grams per liter of bath of an organic dicarboxylic acid consisting of only hydrogen, carbon and oxygen and having 4 to 10 carbons, and (E) a remainder of water in each liter of bath.

3. An aqueous etching bath comprising (A) 30 to 200 grams per liter of bath of nitric acid, (B) 3 to 150 grams per liter of bath of a water-immiscible organic fluid substantially stable in the presence of dilute nitric acid, (C) 0.2 to 20 grams per liter of bath of an ionic, hydrophobic-hydrophilic, organic filming agent selected from the group consisting of organic sulfates and organic sulfonates having at least 8 carbons, (D) from about 0.05 to about 3 grams per liter of bath of adipic acid, and (E) a remainder of water in each liter of bath.

4. An aqueous etching bath comprising (A) 30 to 200 grams per liter of bath of nitric acid, (B) 3 to 150 grams per liter of bath of a water-immiscible organic fluid substantially stable in the presence of dilute nitric acid, (C) 0.2 to 20 grams per liter of bath of an ionic, hydrophobic-hydrophilic, organic filming agent selected from the group consisting of organic sulfates and organic sulfonates having at least 8 carbons, (D) from about 0.05 to about 3 grams per liter of bath of pimelic acid, and (E) a remainder of water in each liter of bath.

5. An aqueous etching bath comprising (A) 30 to 200 grams per liter of bath of nitric acid, (B) 3 to 150 grams per liter of bath of a water-immiscible organic fluid substantially stable in the presence of dilute nitric acid, (C) 0.2 to 20 grams per liter of bath of an ionic, hydrophobic-hydrophilic, organic filming agent selected from the group consisting of organic sulfates and organic sulfonates having at least 8 carbons, (D) from about 0.05 to about 3 grams per liter of bath of malic acid, and (E) a remainder of water in each liter of bath.

6. An aqueous etching bath comprising (A) 30 to 200 grams per liter of bath of nitric acid, (B) 3 to 150 grams per liter of bath of a water-immiscible organic fluid substantially stable in the presence of dilute nitric acid, (C) 0.2 to 20 grams per liter of bath of an ionic, hydrophobic-hydrophilic, water-dispersible, organic sulfonate having at least 10 carbons in an uninterrupted series of carbon to carbon bonds, (D) from about 0.05 to about 3 grams per liter of bath of an organic dicarboxylic acid consisting of only hydrogen, carbon and oxygen and having 4 to 10 carbons, and (E) a remainder of water in each liter of bath.

7. An aqueous etching bath comprising (A) 30 to 200 grams per liter of bath of nitric acid, (B) 3 to 150 grams per liter of bath of a water-immiscible organic fluid substantially stable in the presence of dilute nitric acid, (C) 0.2 to 20 grams per liter of bath of a filming agent characterized by the formula:

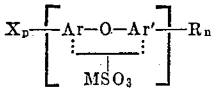

wherein the enclosed molecular nucleus represents a diaryloxide in which Ar and Ar' are selected from a group consisting of phenyl and naphthyl to which nucleus is appended from 1 to 3 sulfonic groups, R is a hydrophobic substituent having up to 30 carbon atoms, *n* is an integer from 1 to 8, a limitation being that the number of carbon atoms of the entire compound does not exceed 50, X is a halogen having an atomic number from 17 to 35, *p* is an integer from 1 to 3 and M is selected from a group consisting of hydrogen, alkali metals, alkaline earth metals, ammonium and substituted ammonium radicals, such filming agent being soluble in the etching bath with partial solubility in each of the bath phases, (D) from about 0.05 to about 3 grams per liter of bath of an organic dicarboxylic acid consisting of only hydrogen, carbon and oxygen and having from 4 to 10 carbon atoms, and (E) a remainder of water in each liter of bath.

8. An etching bath as in claim 7 wherein the organic dicarboxylic acid is adipic acid.

9. An etching bath as in claim 7 wherein the organic dicarboxylic acid is pimelic acid.

10. A method for etching the surface of an acid-soluble metal selected from the group consisting of zinc, zinc base alloys, magnesium and magnesium base alloys to produce a relief image thereon which comprises impinging upon the metal surface to be etched, an aqueous etching bath comprising (A) 30 to 200 grams per liter of bath of nitric acid, (B) 3 to 150 grams per liter of bath of a water-immiscible fluid substantially stable in the presence of dilute nitric acid, (C) 0.2 to 20 grams per liter of bath of an ionic, hydrophobic-hydrophilic, organic filming agent selected from the group consisting of organic sulfates and organic sulfonates having at least 8 carbons, and (D) a small but effective amount of an organic dicarboxylic acid consisting of only hydrogen, carbon and oxygen and having 4 to 10 carbons, said amount being sufficient to increase the depth of etch achieved in small areas of penetration and to minimize lateral etching of the relief image on photoengraving plates etched with the bath.

References Cited in the file of this patent

UNITED STATES PATENTS

| | | |
|---|---|---|
| 1,994,500 | Boller | Mar. 19, 1935 |
| 2,287,050 | Miller | June 23, 1942 |
| 2,640,763 | Easley et al. | June 2, 1953 |
| 3,023,138 | Easley et al. | Feb. 27, 1962 |